United States Patent
Imai et al.

(10) Patent No.: US 6,385,501 B1
(45) Date of Patent: May 7, 2002

(54) ELECTRIC DISCHARGE MACHINING CONTROL METHOD AND ELECTRIC DISCHARGE MACHINING CONTROLLER

(75) Inventors: Yoshihito Imai; Takayuki Nakagawa; Takashi Yuzawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/423,388

(22) PCT Filed: Dec. 4, 1999

(86) PCT No.: PCT/JP98/05484

§ 371 Date: Nov. 8, 1999

§ 102(e) Date: Nov. 8, 1999

(87) PCT Pub. No.: WO99/58278

PCT Pub. Date: Nov. 18, 1999

(30) Foreign Application Priority Data

May 12, 1998 (JP) .......................................... 10-128822

(51) Int. Cl.[7] .............................................. G06F 19/00
(52) U.S. Cl. ...................... 700/162; 219/69.16; 200/41
(58) Field of Search .................................. 700/162, 160, 700/41–43; 318/609, 610; 219/69.16, 69.11, 69.13, 69.17

(56) References Cited

U.S. PATENT DOCUMENTS 5,310,983 A * 5/1994 Chang et al. ............. 219/69.16
5,589,086 A * 12/1996 Sawada et al. ........... 219/69.16

FOREIGN PATENT DOCUMENTS

JP 56-107839 8/1981
JP 8-267323 10/1996

OTHER PUBLICATIONS

"Mechanism of Discharge Machining and Method for Full Utilization of the Same" (Gijutsu Hyoron–sha), Oct. 20, 1979, pp. 88–90. (English translation).

* cited by examiner

Primary Examiner—Leo P. Picard
Assistant Examiner—Steven R. Gorland
(74) Attorney, Agent, or Firm—Leydig, Voit, & Mayer, Ltd.

(57) ABSTRACT

An error signal is obtained from a reference value and a value indicating a detected state in machining, a first controlled variable is obtained by adding a value obtained by multiplying the error signal by a proportion gain to a value obtained by multiplying the error signal by a first integration gain, a second controlled variable is obtained by multiplying an instruction value by a second integration gain for integration, and a value obtained by adding the first controlled variable to the second controlled variable and multiplying the sum by a machining trajectory vector is used as a controlled variable for a driving unit for adjusting a distance between an electrode and a workpiece in discharge machining. Therefore, it is possible to realize a discharge machining control method and apparatus in which the machining speed can be improved by always maintaining the discharge machining process in an optimal state.

10 Claims, 13 Drawing Sheets

FIG.3
(a)
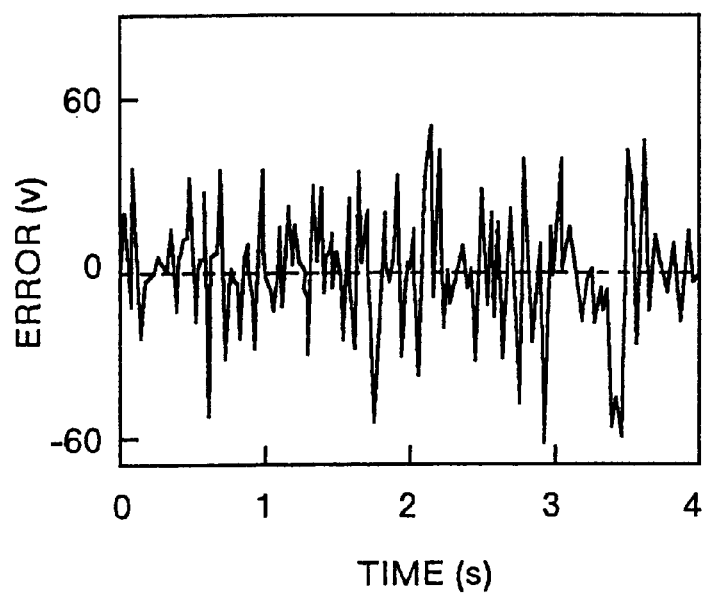
(b) (PRIOR ART)
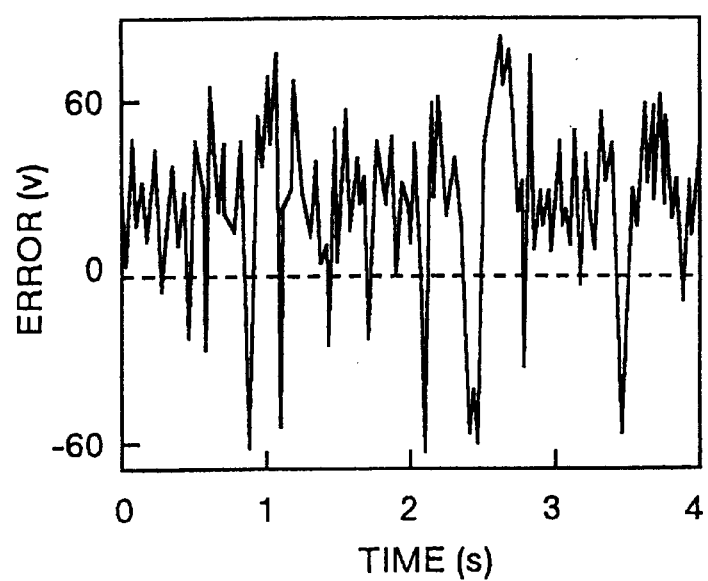

FIG.5
(A) ELECTRODE : COPPER—WORK : STEEL
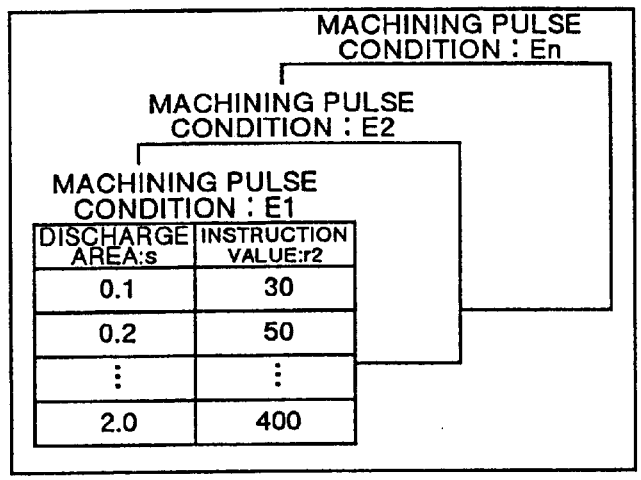
(B) ELECTRODE : GRAPHITE—WORK : STEEL
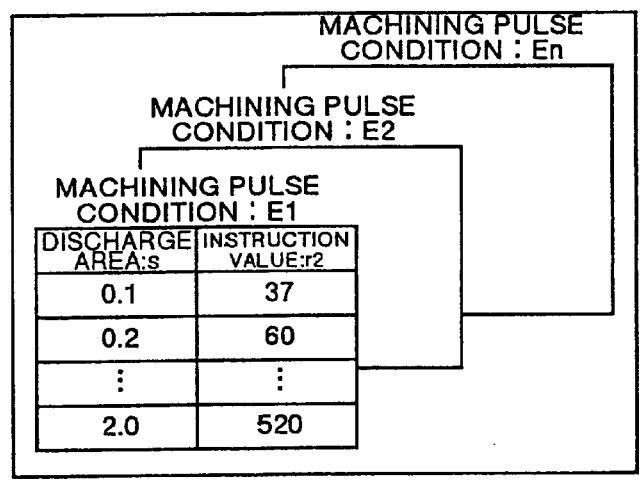
(C) ELECTRODE : COPPER—WORK : SUPPER HARD ALLOY
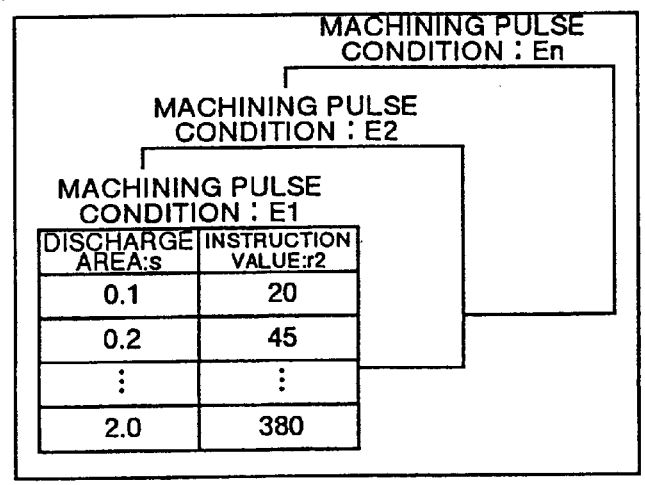

US 6,385,501 B1

ELECTRIC DISCHARGE MACHINING CONTROL METHOD AND ELECTRIC DISCHARGE MACHINING CONTROLLER

TECHNICAL FIELD

The present invention relates to a discharge machining control method and a discharge machining control apparatus in which an electrode and a workpiece are located in a machining liquid and machining is executed by applying a voltage between the electrode and the work to generate electrical discharges.

BACKGROUND ART

In a discharge machining apparatus for executing machining by applying a voltage to a section between an electrode and a workpiece located in a machining liquid to generate discharges for machining the workpiece, a gap distance control system for adjusting a distance between the electrode and the work is provided for maintaining stable machining conditions. FIG. 11 shows configuration of a machining control system including a gap distance control system based on the conventional technology described, for instance, on pages 88 to 90 in "Mechanism of Discharge Machining and Method for Full Utilization of the Same" (Gijutsu Hyoron-sha). In this figure, designated at the reference numeral 101 is a discharge machining process, and at 102 a machining state detecting section. Designated at the reference numeral 103 is a reference value setting section, and at 104 an error signal computing section. Designated at the reference numeral 109 is a machining trajectory setting section, at 110 an electrode driving unit. Designated at the reference numeral 111 is a machining pulse condition setting section, at 112 a machining power supply. Designated at the reference numeral 1101 is a controlled variable computing section. Further, y is a value indicating a state of the discharge machining process 101, and ym is a detected value of y by the machining state detecting section 102. r is a reference value for a machining state set in the reference value setting section 103, and e is an error signal obtained from the detection value ym and the reference value r by the error signal computing section 104. Rv is a machining trajectory instruction value set in the machining trajectory setting section 109, and Up is a controlled variable set obtained from the error signal e and the machining trajectory instruction value set Rv by the controlled variable computing section 1101. Mp is an electrode moving quantity for operation according to the controlled variable set Up by the electrode driving unit 110. Rs is a machining pulse condition instruction value set in the machining pulse condition setting section 111. Ms is a machining pulse quantity operated by the machining power supply 112 according to the instruction value set Rs. It should be noted that the machining trajectory instruction value set Rv and controlled variable set Up are vector values corresponding to X, Y, and Z axes and the electrode driving unit 110 is a X, Y, Z-axial driving unit. The gap distance is controlled according to the electrode moving quantity Mp in the X, Y, Z-axial directions. The machining pulse condition instruction value set Rs comprises such parameters as an open voltage, a peak current, a pulse-ON time, and a pulse-OFF time.

FIG. 12 is a view schematically showing the discharge machining process 101. In this figure, designated at the reference numeral 1201 is an electrode, at 1202 a work, at 1203 a machining liquid, at 1204 discharge occurring between the electrode 1201 and the work 1202, and at 1205 a machined surface by means of electric discharges. In the discharge machining apparatus, a gap distance control system as described below is provided for satisfying required machining precision and machining surface roughness and also for optimizing a machining speed.

FIG. 13 is a view showing contents of operations of a gap distance control system based on the conventional technology. Execution of a gap distance control algorithm is generally carried out by means of software processing utilizing a computer, and the k-th time processing is shown in this figure. Step S201 indicates the processing in the machining state detecting section 102, and herein a machining state in a discharge machining process is detected as an average gap voltage ym(k) Step S202 indicates the processing in the error signal computing section 104, and herein an error signal e(k) is computed from a reference value r of the average gap voltage and the detected ym(k). Step S1301 indicates the processing in the controlled variable computing section 1101, and herein a controlled variable set Up(k) is computed from the machining trajectory instruction value set Rv in the machining trajectory setting section 109 and the error signal e(k), and the controlled variable set Up(k) is instructed to the electrode driving unit 110. Kp is a proportion gain, while Ki is an integration gain, and an electrode is controlled so that the detected ym(k) is equalized to the reference value r by means of the technique of PI compensation (proportion+integration compensation).

In recent years, there has been proposed a machining method in which an electrode having a simple form is used and discharge machining having a three-dimensional form is executed by numerically controlling the electrode. Also cases of performing micro machining utilizing the discharge machining are increasing. In the machining method as described above, an area subjected to discharge machining is smaller as compared to that in the conventional technology, and as a result the moving speed of the machining surface becomes higher, so that it becomes difficult to match the detected value to the reference value without any steady state error in the conventional type of gap distance control system. Namely, a state in the discharge machining process is deviated from the optimal state, so that the machining speed becomes disadvantageously lower.

The present invention was made to solve the problems as described above, and it is an object of the present invention to provide a discharge machining control method as well as a discharge machining apparatus in which it is possible to match the detected value to the reference value without any steady state error even when the discharge machining area is small and to improve the machining speed by keeping a discharge machining process in an optimal state.

DISCLOSURE OF THE INVENTION

In the discharge machining control method according to the present invention, an error signal is obtained from a reference value and a value indicating a detected state of machining; a first controlled variable is obtained by adding a value obtained by multiplying the error signal by a proportion gain to a value obtained by multiplying the error signal by a first integration gain for integration; a second controlled variable is obtained by multiplying an instruction value by a second integration gain for integration; and a controlled variable for a driving unit for adjusting a distance between an electrode and a work is obtained by adding the first controlled variable to the second controlled variable and multiplying the sum by a machining trajectory vector.

Further, in the discharge machining control method according to the present invention, the instruction value is previously registered in a data table in correspondence to at least one of the machining pulse conditions, discharge area, or material of the electrode or work, and the instruction value can be changed during machining.

Further, in the discharge machining control method according to the present invention, process parameters are identified with a signal indicative of a position of the electrode or the work and a value indicative of a detected machining state, or with a signal indicative of the speed of the electrode or the work and a value indicative of a detected machining state, and the instruction value is automatically adjusted during machining depending upon the identified process parameters.

Further, in the discharge machining control method according to the present invention, the second integration gain can freely be adjusted by the operator during machining.

Further, in the discharge machining control method according to the present invention, the controlled variable for the driving unit is obtained by adding (i) a vector obtained by multiplying the first controlled variable by the machining trajectory vector to (ii) a vector obtained by multiplying the second controlled variable by the machining trajectory vector and filtering the result with a filter including inverse system characteristics of the driving unit.

The discharge machining control apparatus according to the present invention has a machining power supply unit for generating an electric discharge by applying a voltage to a section between an electrode and a work, a machining pulse condition setting section for setting machining pulse conditions for the machining power supply unit, a machining trajectory setting section for setting a machining trajectory, a reference setting section for setting a reference, a machining state detecting section for detecting a machining state, an error signal computing section for computing an error signal from the reference value and a value indicative of the detected state, a first controlled variable computing section for obtaining a value by adding a value obtained by multiplying the error signal by a proportion gain to a value obtained by multiplying the error signal by a first integration gain as a first controlled variable, an instruction value setting section for setting an instruction value, a second controlled variable computing section for obtaining a value by multiplying the instruction value by a second integration gain for integration as a second controlled variable, and a third controlled variable computing section for adding the first controlled variable to the second controlled variable and multiplying the sum by a trajectory vector set in the machining trajectory setting section to adjust a distance between an electrode and a work.

Further, the discharge machining control apparatus according to the present invention has an instruction value setting section in which the instruction value is previously registered depending upon the machining conditions or the discharge area and the instruction value can be changed during machining.

Further, the discharge machining control apparatus according to the present invention has a process identifying section for computing process parameters from a signal indicating a position of the electrode or the work and a value indicating the detected state of machining, or from a signal indicating the speed of the electrode or the work and a value indicating the detected state of machining, and an automatic instruction value adjusting section capable of automatically adjusting the instruction value during machining depending upon the identified process parameters.

Further, the discharge machining control apparatus according to the present invention has an integration gain adjusting section enabling the operator to adjust the second integration gain during machining.

Further, the discharge machining control apparatus according to the present invention has a third controlled variable computing section for adding (i) a vector obtained by multiplying first controlled variable by the machining trajectory vector to (ii) a vector obtained by multiplying the second controlled variable by the machining trajectory vector and filtering the result with a filter including at least inverse system characteristics of a driving unit for controlling a distance between the electrode and work.

BRIEF DESCRIPTION OF THE DRAWINGS

FIG. 3 shows error in the average gap voltage in Embodiment 1 of the present invention and in the conventional technology;

FIG. 5 is an example of a data table used for changing the setting of an instruction value in Embodiment 2 of the present invention;

BEST MODE FOR CARRYING OUT THE INVENTION

Detailed description is made for the present invention with reference to the attached drawings.

Figure 1:
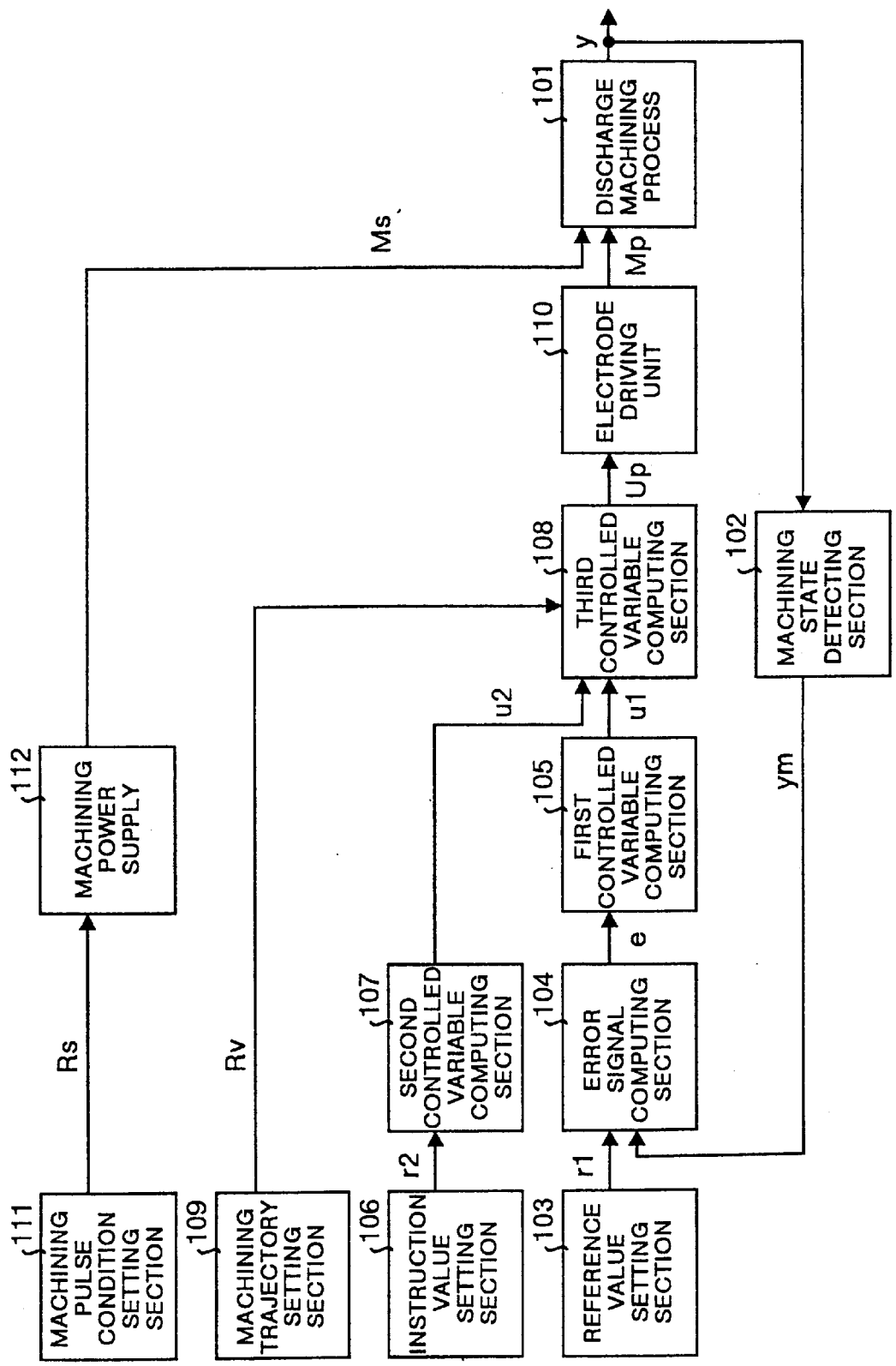
FIG. 1 shows a discharge machining control system according to Embodiment 1 of the present invention.

FIG. 1 is a view showing a discharge machining control system according to Embodiment 1 of the present invention. In this figure, the reference numerals 101 to 104 and 109 to 112 indicate the same components or functions as those in the example based on the conventional technology. Also the value y indicating a machining state, detected value ym, a reference value rl for a machining state, error signal e, machining trajectory instruction value set Rv, controlled variable set Up, electrode moving quantity Mp, machining pulse conditions instruction value set Rs, and machining pulse operating quantity Ms have the same meanings as those in the example based on the conventional technology. In addition, designated at the reference numeral 105 is a first controlled variable computing section, at 106 an instruction value setting section, at 107 a second controlled variable computing section, and at 108 a third controlled variable computing section. Further, u1 is a first controlled variable obtained by the first controlled variable computing section 105 from the error signal e, r2 is an instruction value set in the instruction value setting section 106, u2 is a second controlled variable obtained by the second controlled variable computing section 107 from the instruction value r2. The controlled variable set Up is obtained by the third controlled variable computing section 108 from the first controlled variable u1 and second controlled variable u2.

Figure 2:
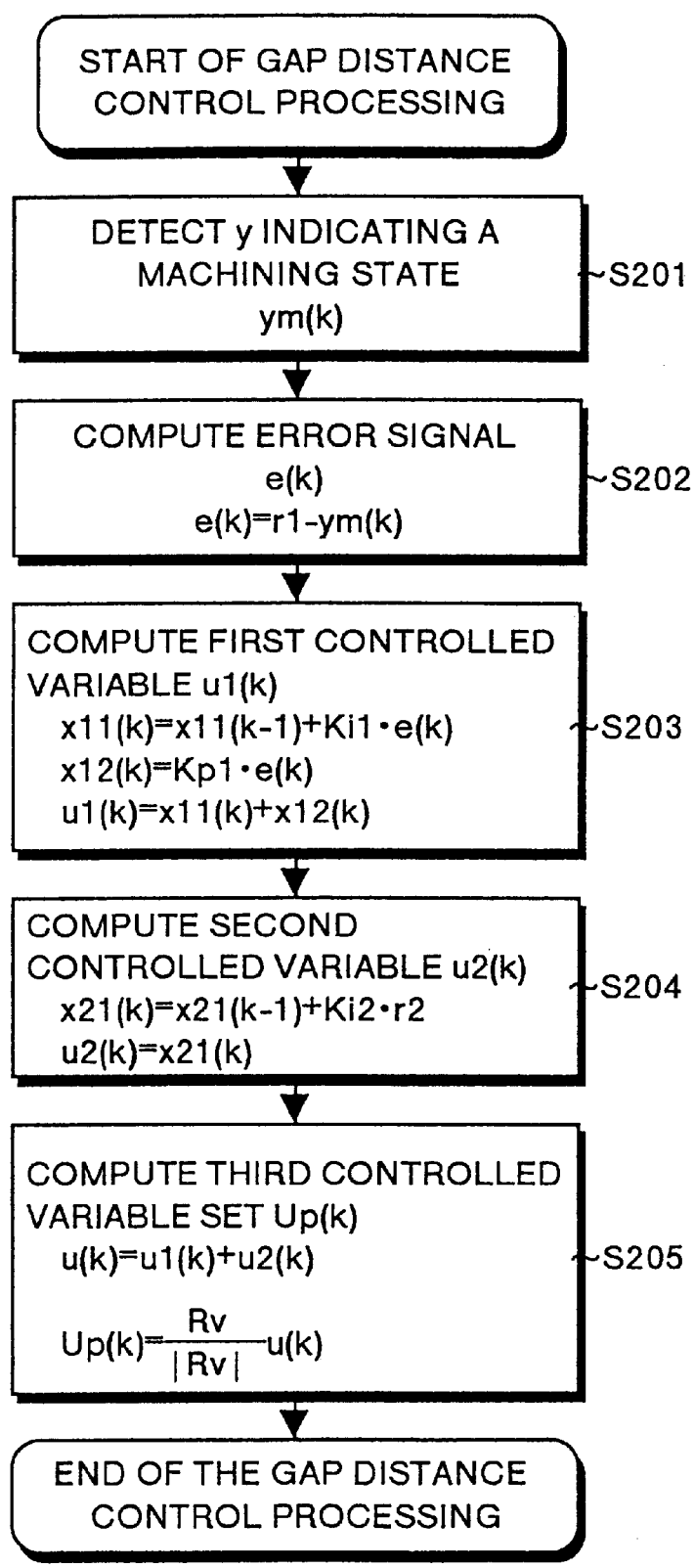
FIG. 2 shows the operations of a gap distance control system of the discharge machining control system shown in FIG. 1.

FIG. 2 shows a flowchart of the operations of the gap distance control system shown in FIG. 1. The gap distance control algorithm is generally executed by means of software processing in a computer, and this figure shows the k-th time processing. Step S201 is the processing performed in the machining state detecting section 102, and herein a machining state in the discharge machining process is detected, for instance, as an average gap voltage ym(k). Step S202 is processing performed in the error signal computing section 104, and herein the error signal e(k) is obtained from a reference value r1 for the average gap voltage and the detected value ym(k) Step S203 is the processing performed in the first controlled variable computing section 105, and herein a first controlled variable u1(k) is obtained from the error signal e(k). Herein Kp1 indicates a proportion gain, while Ki1 indicates a first integration gain. Step S204 is the processing performed in the second controlled variable computing section 107, and herein a second controlled variable u2(k) is obtained from the instruction value r2 in the instruction value setting section 106. Herein while Ki2 indicates a second integration gain. Step S205 is the processing performed in the third controlled variable computing section 108, and herein the first controlled variable u1(k) is added to the second controlled variable u2(k), and then the sum u(k) is multiplied by the machining trajectory instruction value set Rv in the machining trajectory setting section 109 to obtain a controlled variable set Up(k). Herein, assuming that $$Up(k)=(up\_x(k), up\_y(k), up\_z(k)) \text{ and}$$

$$Rv=(rv\_x, rv\_y, rv\_z),$$

the controlled variable set Up(k) can be obtained through the equations as shown below. The controlled variable set Up(k) computed herein is supplied to the electrode driving unit 110:

$$up\_x(k) = \frac{rv\_x}{|Rv|} u(k)$$

$$up\_y(k) = \frac{rv\_y}{|Rv|} u(k)$$

$$up\_z(k) = \frac{rv\_z}{|Rv|} u(k)$$

FIG. 3 shows errors in average gap voltages in Embodiment 1 of the present invention and in an example based on the conventional technology. FIG. 3(a) shows an error between a reference value for an average gap voltage in machining with the gap distance control system according to the present invention and a detected value, while FIG. 3(b) shows a case in machining with the gap distance control system based on the conventional system. In the gap distance control system based on the conventional technology, a steady state error is generated, while in the gap distance control system according to the present invention, a steady state error is substantially suppressed to zero. Therefore, machining speed in the present invention is considerably higher as compared to that in the example based on the conventional technology.

Figure 4:
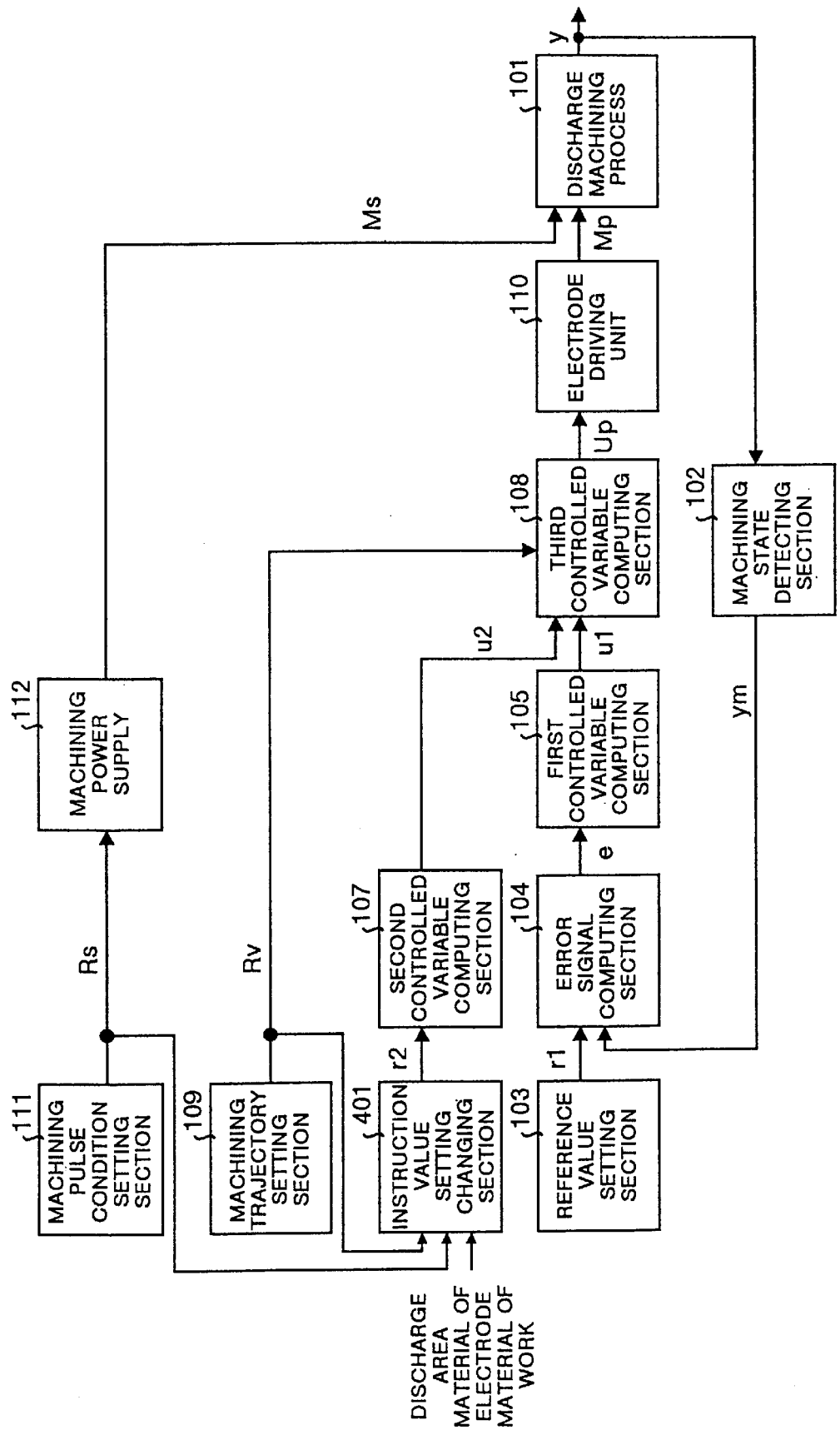
FIG. 4 shows a discharge machining control system according to Embodiment 2 of the present invention.

FIG. 4 shows a discharge machining control system according to Embodiment 2 of the present invention. In this figure, the reference numerals 101 to 105 and 107 to 112 have the same meanings as those in Embodiment 1. The reference numeral 401 indicates an instruction value setting changing section, which changes the instruction value r2 according to the machining pulse condition instruction value set Rs in the machining pulse condition setting section 111, a discharge area previously obtained by a CAM or the like, and material of the electrode and the work used for machining. Herein the discharge area means an area in which the electrode and the work are located opposite to each other and electric discharge is actually generated, and this discharge area changes according to a machining depth. Therefore, the instruction value r2 can be changed during machining according to the machining trajectory instruction value set Rv in the machining trajectory setting section 109 as well as according to the discharge area.

FIG. 5 is a view showing an example of a data table for changing the setting of the instruction r2 in Embodiment 2 of the present invention. As shown in this figure, the data table is divided to zones A, B, C, . . . according to the material of the electrode and the work, and each of these zones are further subdivided to areas E1, E2, . . . En according to machining pulse conditions. A relationship between the discharge area and the instruction value is described in each of the data tables.

Figure 6:
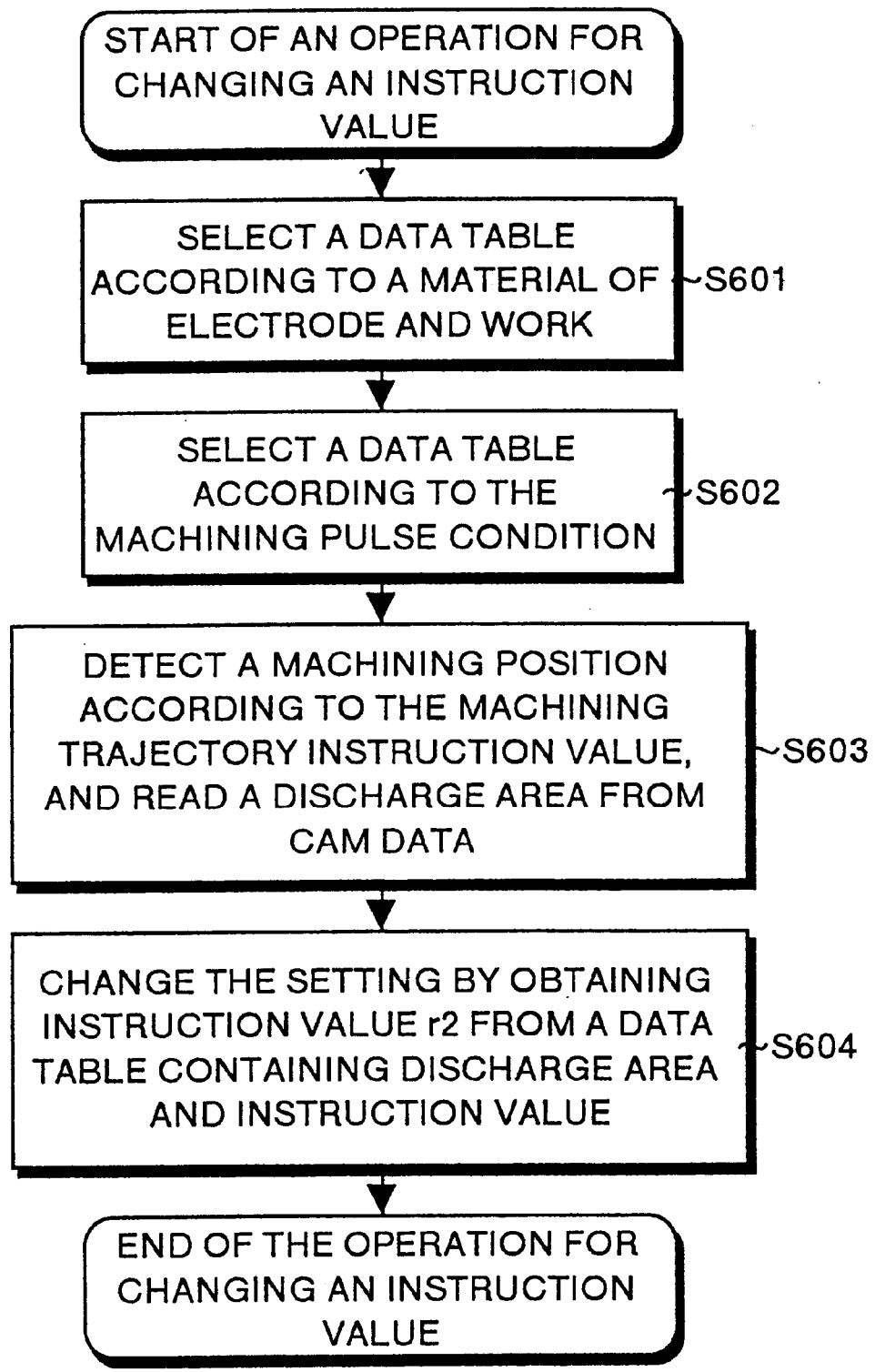
FIG. 6 shows the operation of changing the setting of an instruction value in Embodiment 2 of the present invention.

FIG. 6 shows a flowchart of the operation of changing of the instruction value in Embodiment 2 of the present invention, and shows the k-th time software processing in the instruction value setting changing section 401 for obtaining an instruction value making use of the data table shown in FIG. 5. In step S601, one of the zones A, B, C, . . . is selected according to the material of the electrode and the work used for machining. Herein it is assumed that zone A is selected. In step S602, one of the areas E1, E2, . . . En is selected according to the machining pulse condition used in machining in the zone A. Herein it is assumed that the area E1 is selected. In step S603, a machining position at that point of time is detected according to the machining trajectory instruction value set Rv, and a discharge area is read from the CAM data. In step S604, the instruction r2 is decided by interpolation using the obtained discharge area and the data table E1. By executing the processing as described above, it becomes possible to decide an appropriate instruction value in response to change of a material of an electrode or a work used for machining, machining pulse conditions, and discharge area.

Description is made for a general method of deciding the instruction value by using a data table above, and for instance, when a cylindrical electrode is used and machining is executed while compensating wear of the electrode, a relation between the electrode diameter, electrode feed gradation for compensating wear of the electrode, and the instruction value may be described as a function for each machining pulse condition. The function can be described, for instance, as shown below. Herein the electrode feed gradation A means that, when the electrode is fed by a unit distance on the XY plane, the electrode is fed by a distance A in the Z-axial direction.

$$r2=\alpha D^\beta A^\gamma$$

It should be noted that computing for raising a D of an electrode diameter to the β-th power or for raising A of an electrode feed gradation to the γ-th power may be made through an approximating equation based on the Taylor expansion as shown below. Herein, In indicates a natural logarithm.

$$r2 = \alpha \left[1 + \beta \ln D + \frac{(\beta \ln D)^2}{2!} + \frac{(\beta \ln D)^3}{3!} + \cdots \right]$$

$$\left[1 + \gamma \ln A + \frac{(\gamma \ln A)^2}{2!} + \frac{(\gamma \ln A)^3}{3!} + \cdots \right]$$

As described above, by using a function in place of a data table, it is possible to change setting by computing the instruction value from a smaller quantity of data as compared to that in a data table.

Figure 7:
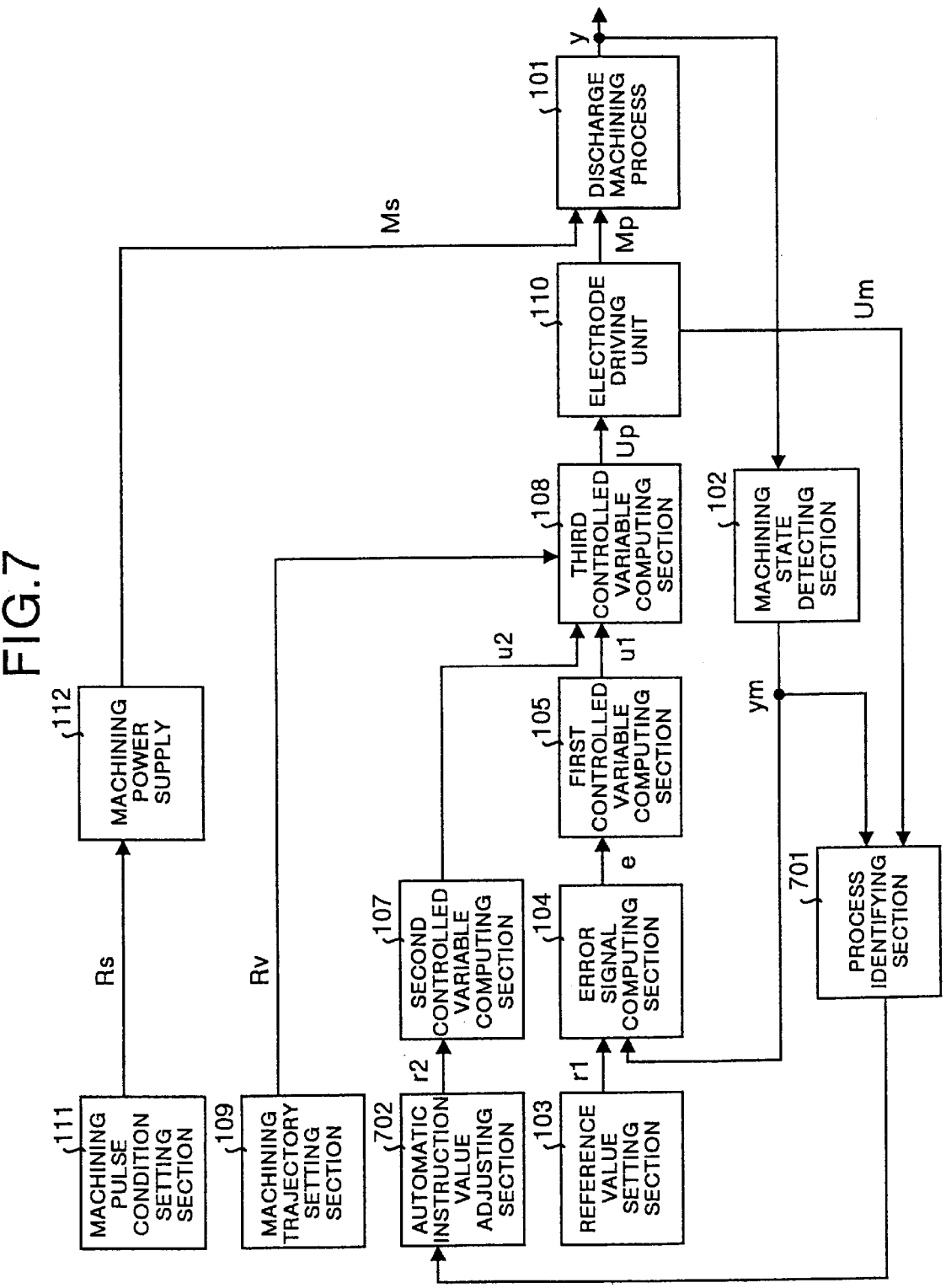
FIG. 7 shows a discharge machining control system to Embodiment 3 of the present invention.

FIG. 7 shows a discharge machining control system according to Embodiment 3 of the present invention. In this figure, the reference numerals 101 to 105, and 107 to 112 have the same meanings as those shown in Embodiment 1. Designated at the reference numeral 701 is a process identifying section, and at 702 an automatic instruction value adjusting section. Um is a signal indicative of a position or a speed of the electrode or the work along the X, Y, Z-axes. The process identifying section 701 computes process parameters from a signal indicating a position of the electrode or the work and a value indicating a detected state in machining, or from a signal indicating a speed of the electrode or the work and a value indicating the detected state in machining. The automatic instruction value adjusting section 702 automatically adjusts the instruction value r2 according to the computed process parameters.

In the process identifying section 701, an ARMAX (Auto-Regressive Moving Average eXogenious) model as described in the following equation is used, for instance, as a discharge machining process model. Herein $A(Z^{-1})$, $B(Z^{-1})$, $C(Z^{-1})$ indicates dynamic characteristics in the discharge machining process, ym(k) indicates a value indicating a detected state in machining, and um(k) indicates a signal indicating a position or a signal of an electrode and a speed in the machining direction obtained from Um(k), and w(k) indicates a white noise.

$$A(z^{-1})ym(k)=B(z^{-1})um(k)+C(z^{-1})w(k)$$

$$A(z^{-1})=1+a_1z^{-1}+\ldots+a_nz^{-n}$$

$$B(z^{-1})=b_1z^{-1}+\ldots+b_mz^{-m}$$

$$C(z^{-1})=1+c_1z^{-1}+\ldots+c_lz^{-l}$$

Figure 8:
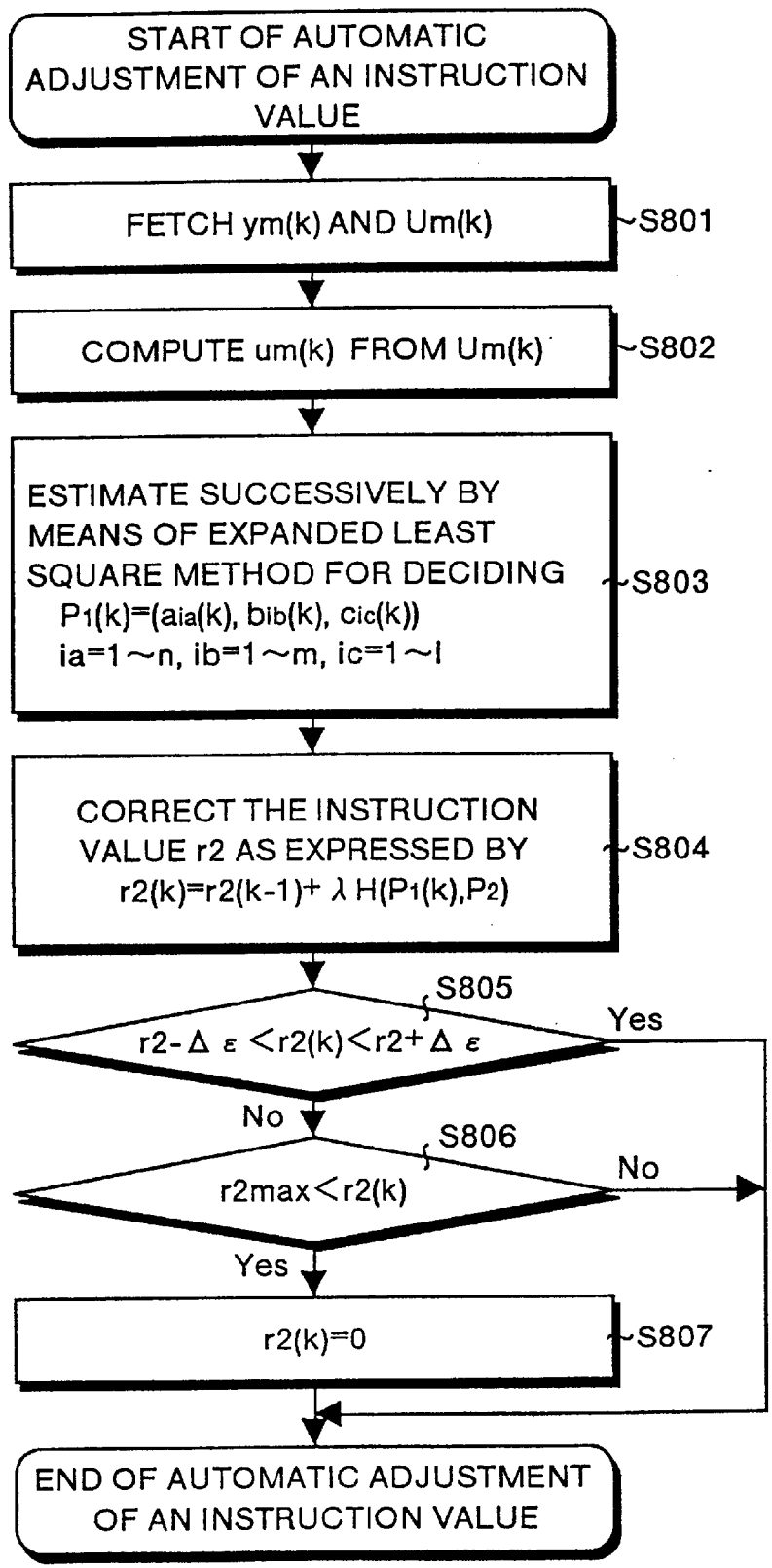
FIG. 8 is a view showing k-th time software processing in the process identifying section and in the automatic instruction value adjusting section in Embodiment 3 of the present invention.

FIG. 8 is a view showing the k-th time software processing by the process identifying section 701 and automatic instruction value adjusting section 702 in Embodiment 3 of the present invention. The processing in steps S801 to S803 is performed in the process identifying section 701, while processing in steps S804 to S807 is performed in the automatic instruction value adjusting section 702. At first in steps S801 to S803, the parameters for each of the $A(Z^{-1})$, $B(Z^{-1})$, $C(Z^{-1})$ described in the following equation are successively estimated using ym(k) and um(k) by means of the expanded least square method.

Parameter $P_1(a_{ia}(k), b_{ib}(k), c_{ic}(k))$, where ia=1 to n, ib=1 to m, ic=1 to 1

Assuming the discharge machining process as described above, it is possible to analytically obtain a relation between the instruction value r2 and a steady state error, namely a steady value of the error signal e(k). $P_1$ is a process parameter for the discharge machining process estimated in the process identifying section 701, and $P_2$ is a known parameter in each of the electrode driving section 110, first controlled variable computing section 105, second controlled variable computing section 107, third controlled variable computing section 108, and machining state detecting section 102.

$$r2=H(P_1, P_2)$$

Accordingly, if the parameter $P_1$ for the discharge machining process can be obtained by the process identifying section 701 with high precision, the instruction value r2 can be decided by substituting $P_1$ and $P_2$ into the function H. Namely, if the actual discharge machining process can be described with a linear model ARMAX, it is possible to set an appropriate instruction value r2 by executing adjustment once through the above-described equation and without preparing the data table as described above.

However, in a machining state where there is a large error, it is difficult to describe the actual discharge machining process with a linear model.

In such a case, the instruction value r2 is adjusted several times through the following equation in step S804. Herein λ indicates again, while r2(k-1) is a (k-1)-th set value r2 and $P_1(k)$ is an estimated parameter for the k-th time discharge machining process.

$$r2(k)=r2(k-1)+\lambda H(P_1(k), P_2)$$

In step S805, it is determined whether r2(k) is within an allowable error Δε for the optimal instruction value r2 or not. If the condition r2−Δε<r2(k)<r2+Δε is satisfied then the correction is terminated. If the condition r2−Δε<r2(k)<r2+Δε is not satisfied then the system control is shifted to step S806. In step S806, it is determined whether r2(k) exceeds the maximum allowable instruction value r2max or not. If r2(k) is not bigger than r2max, then the correction is terminated. If r2(k) is bigger than r2max, then the system control is shifted to step S807. In step S807, r2(k) is set to 0 and the correction is again started.

As described above, by repeatedly executing identification of the parameter for the discharge machining process and adjustment of the instruction value, an optimal instruction value can be obtained even in the state where it is difficult to described the process parameter with a linear model.

In a case where there occurs fluctuations during a discharge machining process, a forgetting factor may be introduced into the expanded least square method. When a position signal is used as um(k), the differential signal of um(k) may be used instead of um(k).

Figure 9:
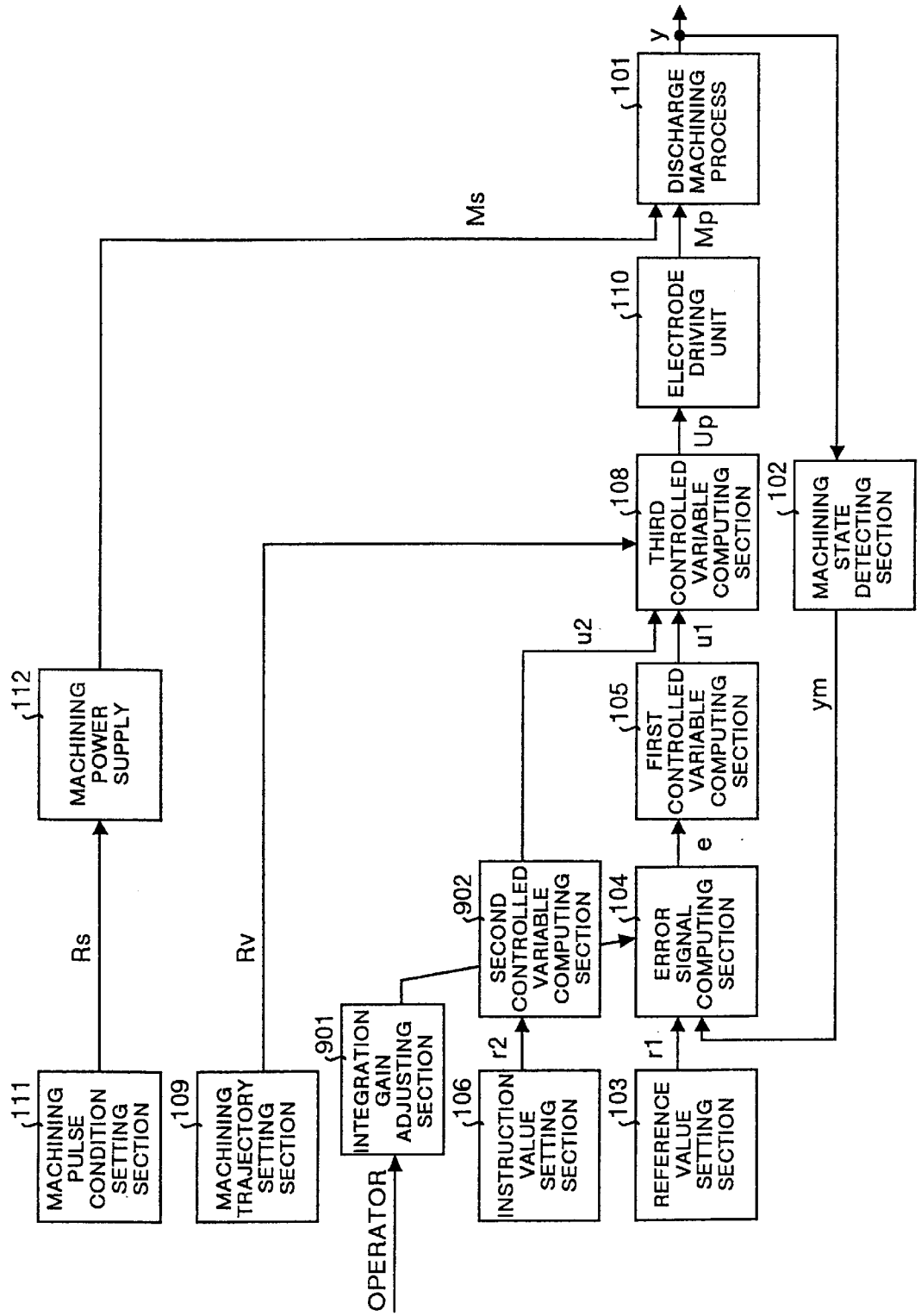
FIG. 9 shows a discharge machining control system according to Embodiment 4 of the present invention.

FIG. 9 shows a discharge machining control system according to Embodiment 4 of the present invention. In this figure, the reference numerals 101 to 106 and 108 to 112 have the same meanings as those in Embodiment 1. The reference numeral 901 indicates an integration gain adjusting section, and the reference numeral 902 indicates a second controlled variable computing section. The integration gain adjusting section 901 makes it possible for an operator to change the integration gain in the second controlled variable computing section 902 during machining. The second controlled variable computing section 902 computes a second controlled variable from the integration gain changed according to the instruction from the integration gain adjusting section 901. As described above, the operator can adjust the integration gain during machining in depending upon the situation in the discharge machining process, so that fine adjustment is possible and also necessary measures can be taken for an emergent situation.

Figure 10:
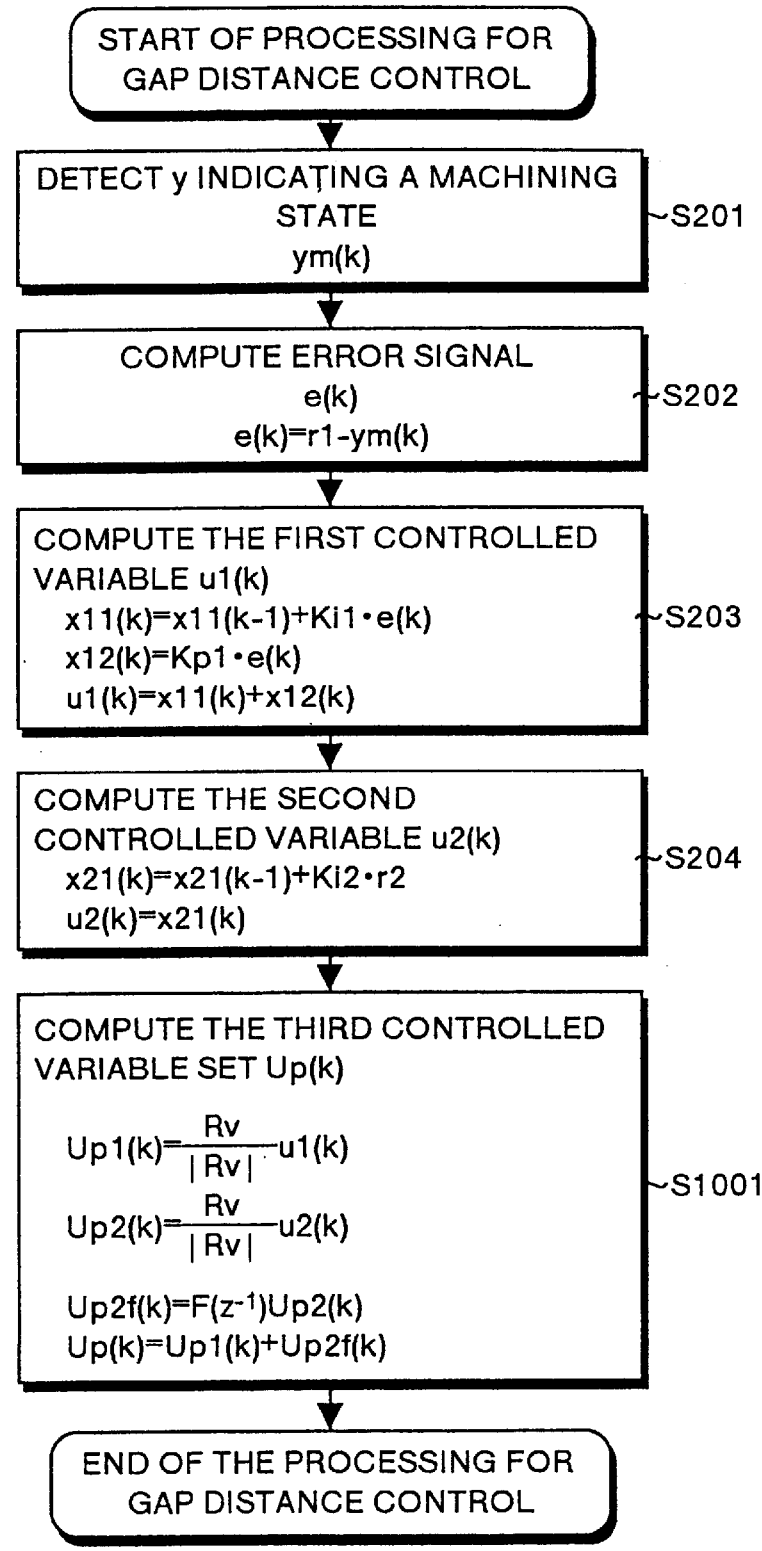
FIG. 10 is a view showing k-th time software processing for a gap distance control algorithm according to Embodiment 5 of the present invention.
Figure 11:
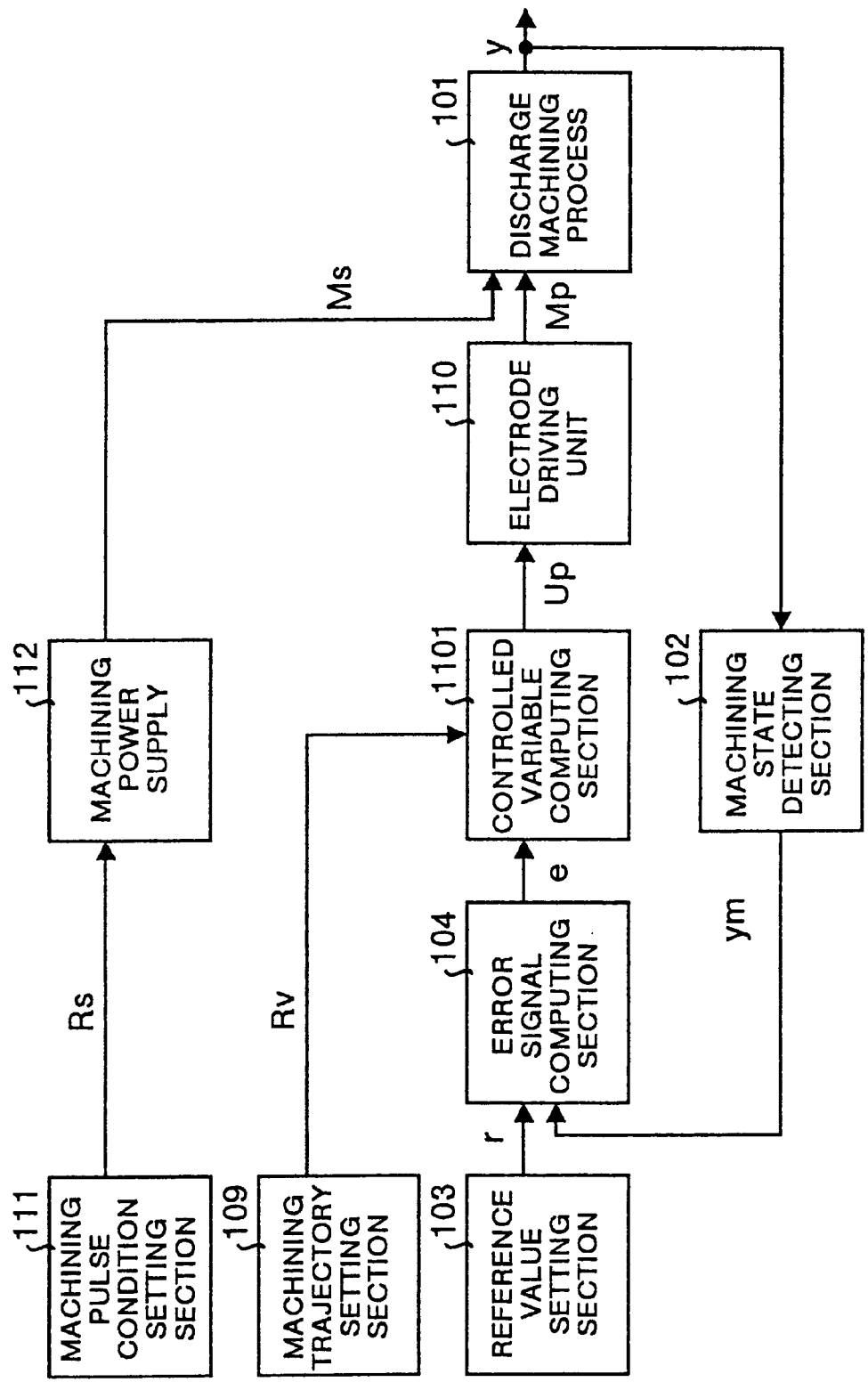
FIG. 11 is a view showing configuration of a machining control system including a gap distance control system based on the conventional technology.
Figure 12:
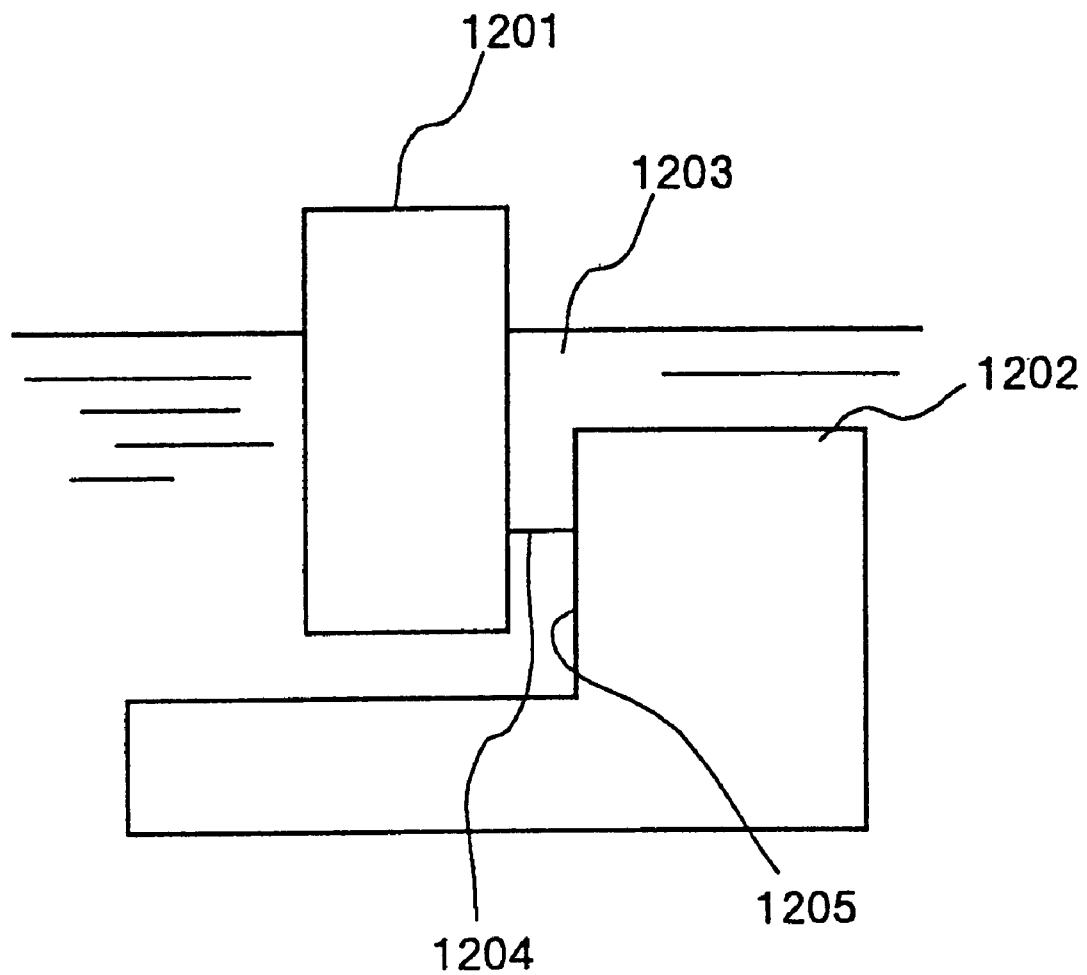
FIG. 12 is a view schematically showing a discharge machining process.
Figure 13:
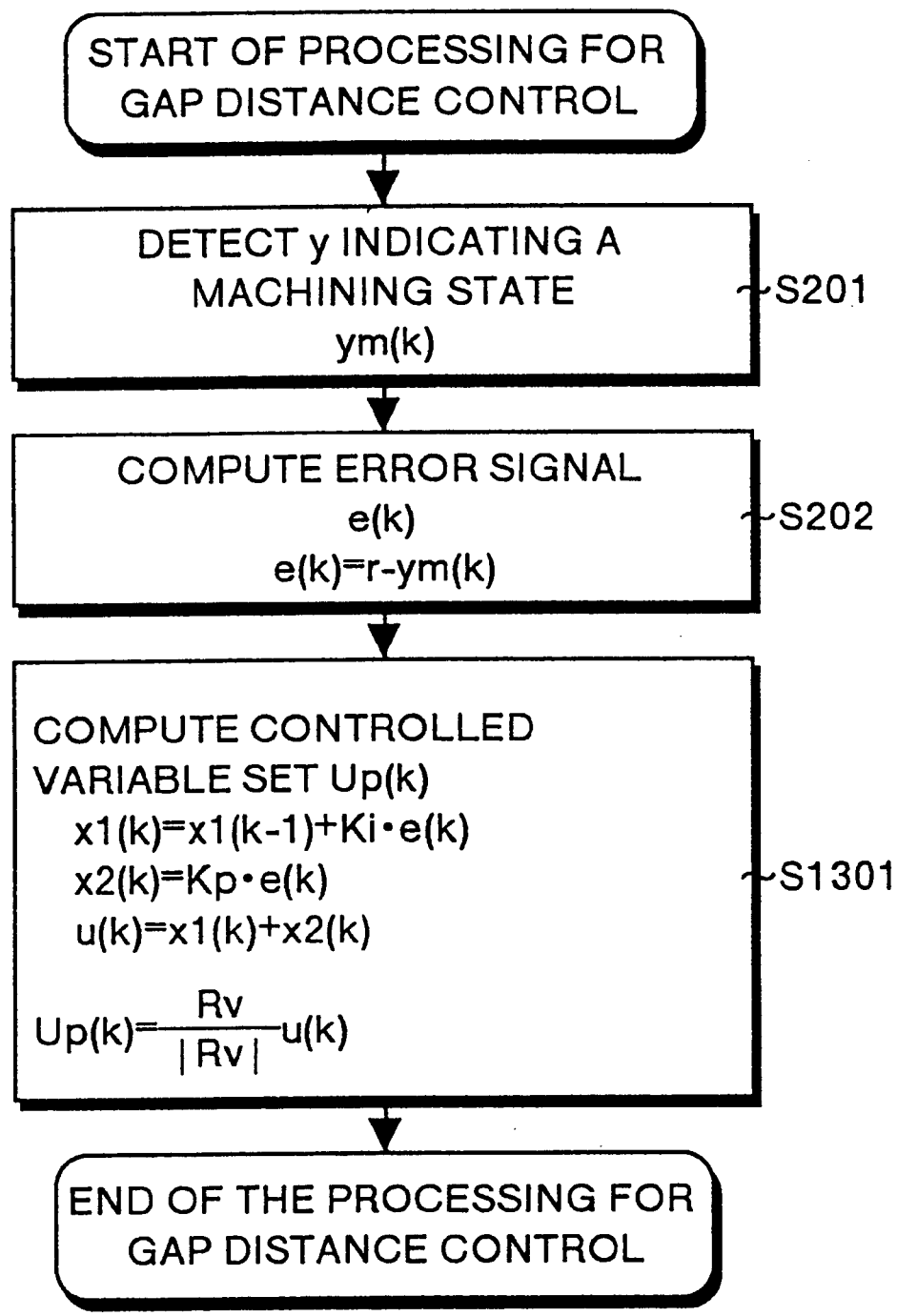
FIG. 13 shows operations of the gap distance control system based on the conventional technology.

FIG. 10 is a view showing k-th time software processing for a gap distance control algorithm in Embodiment 5 of the present invention. The processing in steps S201 to S204 is the same as that shown in FIG. 2. Step S1001 is the processing performed in the third controlled variable computing section 108, and herein at first Up1(k) is obtained by multiplying the first controlled variable u1(k) by the machining trajectory instruction value set Rv in the machining trajectory setting section 109 and also Up2(k) is computed by multiplying the second controlled variable u2(k) by the machining trajectory instruction value set Rv in the machining trajectory setting section 109. Contents of each operation is the same as those in Embodiment 1. Then filtering is executed to Up2(k) with a filter $F(Z^{-1})$ including inverse system characteristics of a driving unit for each of the XYZ axes to obtain Up2f(k). Herein, considering that, $$up2f(k)=(up2f\_x(k), up2f\_y(k), upf2\_z(k))$$

$$Up2f(k)=(Up2f\_x, up2f\_y, upf2\_z(k)), \text{ and}$$

$$F(z^{-1})=(f\_x(z^{-1}), f\_y(z^{-1}), f\_z(z^{-1})),$$

Up2f(k) can be obtained through the following equation. Finally, Up1(k) and Up2f(k) obtained by filtering are added to each other to obtain a controlled variable Up(k). The obtained controlled variable Up(k) is supplied to the electrode driving section 110.

$$up2f\_x(k)=f\_x(z^{-1}) \, up2\_x(k)$$

$$up2f\_y(k)=f\_y(z^{-1}) \, up2\_y(k)$$

$$up2f\_z(k)=f\_z(z^{-1}) \, up2\_z(k)$$

When a machining pulse condition or a discharge area changes during machining, the instruction value is changed according to this change, however the dynamic characteristics of the electrode driving unit affects the effectiveness in changing the instruction value. As described above, by executing filtering, it is possible to cancel characteristics of the electrode driving unit and also to quickly respond to a change in a discharge machining process.

The discharge machining control method according to the present invention comprises the steps of computing an error signal from a reference value and a value indicating a detected state in machining; computing a value obtained by adding a value obtained by multiplying the error signal by a proportion gain to a value obtained by multiplying the error signal by a first integration gain for integration as a first controlled variable; computing a value obtained by multiplying an instruction value by a second integration gain for integration as a second controlled variable; and using a value obtained by adding the first controlled variable to the second controlled variable and multiplying the sum by a machining trajectory vector as a controlled variable for a driving device for adjusting a distance between an electrode and a work. Therefore, there is provided the advantage that a discharge machining process can be maintained in the optimal state even when the discharge machining area is small and the machining speed can be improved.

Further, in the discharge machining control method according to the present invention, the instruction value is previously registered in a data table in correspondence to at least one of the machining pulse conditions, discharge area, or material of the electrode or the work, and setting of the instruction value is changed during machining. Therefore, there is provided the advantage that, even when the discharge machining area is small and at the same time the material of the electrode or the work is different, the discharge machining process can be maintained in the optimal state even if the machining pulse condition or the discharge machining area changes during machining, and the machining speed can be improved.

Further, in the discharge machining control method according to the present invention, the instruction value is automatically changed during machining according to the process parameters which is identified from a signal indicative of a position of the electrode or the work and a value indicative of a detected state in machining, or from a signal indicative of a speed of the electrode or the work and a value indicative of a detected state in machining. Therefore, there is provided the advantage that, even when the discharge machining area is small and at the same time the discharge machining process fluctuates, the discharge machining process can be maintained in the optimal state even if the machining pulse condition or the discharge machining area changes during machining, and the machining speed can be improved.

Further, in the discharge machining control method according to the present invention, the second integration gain is adjusted by the operator during machining. Therefore, there is provided the advantage that, even when the discharge machining area is small and at the same time the discharge machining process fluctuates, the discharge machining process can be maintained in the optimal state even if the machining pulse condition or the discharge machining area changes during machining and the machining speed can be improved.

Further, in the discharge machining control method according to the present invention, the controlled variable for the driving unit is obtained by adding (i) a vector obtained by multiplying the first controlled variable by the machining trajectory vector to (ii) a vector obtained by multiplying the second controlled variable by the machining trajectory vector and filtering the result with a filter including inverse system characteristics of the driving unit. Therefore, there is provided the advantage that, even when the discharge machining area is small and at the same time the discharge machining process fluctuates, the discharge machining process can be maintained in the optimal state even if the machining pulse condition or the discharge machining area changes during machining and the machining speed can be improved.

The discharge machining control apparatus according to the present invention comprises a machining power supply unit for generating an electric discharge by applying a voltage between an electrode and a work; a machining pulse condition setting section for setting machining pulse conditions for the machining power supply unit; a machining trajectory setting section for setting a machining trajectory; a reference value setting section for setting a reference value; a machining state detecting section for detecting a machining state; an error signal computing section for computing an error signal from the reference value and the value indicative of the detected state in machining; a first controlled variable computing section for obtaining a value by adding a value obtained by multiplying the error signal by a proportion gain to a value obtained by multiplying the error signal by a first integration gain as a first controlled variable; an instruction setting section for setting an instruction value; a second controlled variable computing section for obtaining a value by multiplying the instruction value by a second integration gain for integration as a second controlled variable; and a third controlled variable computing section for adding the first controlled variable to the second controlled variable and multiplying the sum by a trajectory vector set in the machining trajectory setting section to adjust a distance between an electrode and a work. Therefore, there is provided the advantage that a discharge machining process can be maintained in the optimal state even when the discharge machining area is small, and the machining speed can be improved.

Further, the discharge machining control apparatus according to the present invention comprises an instruction value setting section in which the instruction value is previously registered in a data table in depending upon at least one of a machining pulse condition, a discharge area, and the material of the electrode or the work, and the instruction value can be changed during machining. Therefore, there is provided the advantage that, even when the discharge machining area is small and at the same time a material of the electrode or the work is different, the discharge machining process can always be maintained in the optimal state even if the machining pulse condition or the discharge machining area changes during machining, and further the machining speed can be improved.

Further, the discharge machining control apparatus according to the present invention comprises a process identifying section for computing process parameters from a signal indicating the position of the electrode or the work and a value indicating a detected state in machining or from a signal indicating a speed of the electrode or the work and a value indicating a detected state in machining; and an automatic instruction value adjusting section capable of automatically adjusting the instruction value during machining depending upon the identified process parameters. Therefore, there is provided the advantage that, even when the discharge machining area is small and at the same time the discharge machining process fluctuates, the discharge machining process can always be maintained in the optimal state and the machining speed can be improved.

Further, the discharge machining control apparatus according to the present invention comprises an integration gain adjusting section enabling the operator to adjust the second integration gain during machining. Therefore, there is provided the advantage that, even when a discharge machining area is small and at the same time the discharge machining process fluctuates, the discharge machining process can always be maintained in the optimal state and the machining speed can be improved.

Further, the discharge machining control apparatus according to the present invention comprises a third controlled variable computing section for adding (i) a vector obtained by multiplying the first controlled variable by the machining trajectory vector to (ii) a vector obtained by multiplying the second controlled variable by the machining trajectory vector and filtering the result with a filter including at least inverse system characteristics of a driving unit for controlling a distance between an electrode and a work. Therefore, there is provided the advantage that, even when the discharge machining area is small and at the same time the discharge machining process fluctuates, the discharge machining process can always be maintained in the optimal state and the machining speed can be improved.

INDUSTRIAL APPLICABILITY

As described above, the discharge machining control method and discharge machining control apparatus according to the present invention uses an electrode having a simple form and is effective in executing three-dimensional discharge machining by numerically controlling the electrode, and further is well adapted to micro machining by means of discharge machining.

We claim:

1. A discharge machining control method for discharge machining between an electrode and a workpiece in a machining liquid, having a voltage applied between the electrode and the workpiece to generate an electrical discharge for machining, said method comprising:

computing an error signal from a reference value and a value indicating a detected state in machining;

computing a first controlled variable by adding (i) a value obtained by multiplying the error signal by a proportional gain to (ii) a value obtained by multiplying the error signal by a first integration gain;

computing a second controlled variable by multiplying an instruction value by a second integration gain; and adding the first controlled variable to the second controlled variable to produce a first sum and multiplying the first sum by a machining trajectory vector as a controlled variable for driving a unit for adjusting a distance between the electrode and the workpiece.

2. The discharge machining control method according to claim 1, wherein the instruction value is previously registered depending upon at least one of a machining pulse condition, a discharge area, and a material of one of the electrode and the workpiece, including changing the instruction value during machining.

3. The discharge machining control method according to claim 1 including changing the instruction value automatically during machining according to process parameters obtained from (i) a signal indicating position of one of the electrode and the workpiece and a value indicating a detected state in machining, or (ii) from a signal indicating speed of one of the electrode and the workpiece and a value indicating a detected state in machining.

4. The discharge machining control method according to claim 1 including adjusting the second integration gain during machining.

5. The discharge machining control method according to claim 1, including obtaining the controlled variable for the driving unit by adding (i) a vector obtained by multiplying the first controlled variable by the machining trajectory vector to (ii) a vector obtained by multiplying the second controlled variable by the machining trajectory vector to produce a second sum and filtering the second sum with a filter including reverse system characteristics of the driving unit.

6. A discharge machining control apparatus comprising:

a machining power supply unit for generating an electric discharge by applying a voltage between an electrode and a workpiece located in a machining liquid;

a machining pulse condition setting section for setting machining pulse conditions for said machining power supply unit;

a machining trajectory setting section for setting a machining trajectory;

a reference value setting section for setting a reference value;

a machining state detecting section for detecting a machining state;

an error signal computing section for computing an error signal from the reference value and the value indicating a detected state in machining;

a first controlled variable computing section for obtaining a first controlled variable by adding (i) a product obtained by multiplying the error signal by a proportional gain to (ii) a product obtained by multiplying the error signal by a first integration gain;

an instruction setting section for setting an instruction value;

a second controlled variable computing section for obtaining a second controlled variable by multiplying the instruction value by a second integration gain for integration; and a third controlled variable computing section for obtaining a controlled variable for a driving unit for adjusting a distance between said electrode and said workpiece by adding the first controlled variable to the second controlled variable to produce a first sum and multiplying the first sum by a trajectory vector set in said machining trajectory setting section.

7. The discharge machining control apparatus according to claim 6 further comprising an instruction value setting changing section in which the instruction value is previously registered in a data table, depending upon at least one of a machining pulse condition, a discharge area, and the material of one of said electrode and said workpiece, wherein the instruction value can be changed during machining.

8. This discharge machining control apparatus according to claim 6 further comprising:

a process identifying section for computing process parameters from (i) a signal indicating a position of one of said electrode and said workpiece and a value indicating a detected state in machining or (ii) from a signal indicating a speed of one of said electrode and said workpiece and a value indicating a detected state in machining; and an automatic instruction value adjusting section for automatically adjusting the instruction value during machining according to process parameters.

9. The discharge machining control apparatus according to claim 6 further comprising an integration gain adjusting section for adjusting the second integration gain during machining.

10. The discharge machining control apparatus according to claim 6 further comprising a third controlled variable computing section for adding (i) a vector obtained by multiplying the first controlled variable by the machining trajectory vector to (ii) a vector obtained by multiplying the second controlled variable by the machining trajectory vector to produce a second sum and filtering the second sum with a filter including at least inverse system characteristics of the driving unit for controlling distance between said electrode and said workpiece.

* * * * *

UNITED STATES PATENT AND TRADEMARK OFFICE
CERTIFICATE OF CORRECTION

PATENT NO.   : 6,385,501 B1  Page 1 of 1
DATED        : May 7, 2002
INVENTOR(S)  : Imai et al.

It is certified that error appears in the above-identified patent and that said Letters Patent is hereby corrected as shown below:

<u>Title page,</u>
Item [22], PCT Filed: insert -- Dec. 4, 1998 --

Signed and Sealed this

Twenty-second Day of October, 2002

Attest:

Attesting Officer

JAMES E. ROGAN
*Director of the United States Patent and Trademark Office*